United States Patent
Chen et al.

(10) Patent No.: US 11,494,458 B1
(45) Date of Patent: Nov. 8, 2022

(54) SYSTEMS AND METHODS FOR PROVIDING CONTENT

(71) Applicant: Meta Platforms, Inc., Menlo Park, CA (US)

(72) Inventors: Michael Chen, Thousand Oaks, CA (US); Reagan Kim, Redwood City, CA (US); Matthew Jianzhong Cheok, San Francisco, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 221 days.

(21) Appl. No.: 16/425,684

(22) Filed: May 29, 2019

Related U.S. Application Data

(60) Provisional application No. 62/827,135, filed on Mar. 31, 2019.

(51) Int. Cl.
| | | |
|---|---|---|
| *G06F 3/0481* | (2022.01) | |
| *G06F 16/958* | (2019.01) | |
| *G06F 3/0482* | (2013.01) | |
| *G06F 3/0486* | (2013.01) | |
| *H04L 65/612* | (2022.01) | |
| *H04L 67/50* | (2022.01) | |
| *G06T 11/60* | (2006.01) | |

(52) U.S. Cl.
CPC .......... *G06F 16/958* (2019.01); *G06F 3/0481* (2013.01); *G06F 3/0482* (2013.01); *G06F 3/0486* (2013.01); *H04L 65/612* (2022.05); *H04L 67/535* (2022.05); *G06T 11/60* (2013.01)

(58) Field of Classification Search
CPC .... G06F 16/958; G06F 3/0481; G06F 3/0486; G06F 3/0482; H04L 67/22; H04L 65/4084; G06T 11/60
See application file for complete search history.

(56) References Cited

U.S. PATENT DOCUMENTS

| | | | | |
|---|---|---|---|---|
| 2010/0159967 A1* | 6/2010 | Pounds | ............... | H04L 51/14 709/206 |
| 2013/0155116 A1* | 6/2013 | Paretti | ............... | G09G 5/14 345/619 |
| 2013/0268889 A1* | 10/2013 | Barak | ............... | G06F 3/048 715/825 |
| 2014/0013254 A1* | 1/2014 | Hosein | ............... | G06F 3/0486 715/765 |
| 2014/0282029 A1* | 9/2014 | Vishria | ............... | H04L 67/02 715/738 |
| 2016/0041833 A1* | 2/2016 | Standley | ............... | G06F 9/4494 718/100 |
| 2017/0329851 A1* | 11/2017 | Yan | ............... | G06F 16/957 |
| 2017/0373997 A1* | 12/2017 | Deng | ............... | G06Q 50/01 |
| 2018/0018063 A1* | 1/2018 | Pritchard | ............... | G06F 3/0484 |
| 2018/0225015 A1* | 8/2018 | SanGiovanni | ............... | G06F 40/14 |
| 2018/0276227 A1* | 9/2018 | Bowring | ............... | G06F 16/958 |

* cited by examiner

*Primary Examiner* — Jeanette J Parker
(74) *Attorney, Agent, or Firm* — Sheppard Mullin Richter & Hampton LLP

(57) ABSTRACT

Systems, methods, and non-transitory computer-readable media can receive one or more content tiles to be presented to a user, wherein the one or more content tiles are arranged in an order. The one or more content tiles are presented within one or more pages of a paginated content grid user interface. Each page comprises a plurality of positions defined by a plurality of rows and a plurality of columns. Presentation of the one or more content tiles within the paginated content grid user interface is modified based on refresh criteria.

20 Claims, 9 Drawing Sheets

500

```
┌─────────────────────────────────────────────────────────────────────────┐
│ Receive one or more content tiles to be presented to a user, wherein    │
│ the one or more content tiles are arranged in an order                  │
│                                502                                      │
└─────────────────────────────────────────────────────────────────────────┘
                                   │
                                   ▼
┌─────────────────────────────────────────────────────────────────────────┐
│ Present the one or more content tiles within one or more pages of a     │
│ paginated content grid user interface, wherein each page comprises a    │
│ plurality of positions defined by a plurality of rows and a plurality   │
│ of columns                                                              │
│                                504                                      │
└─────────────────────────────────────────────────────────────────────────┘
                                   │
                                   ▼
┌─────────────────────────────────────────────────────────────────────────┐
│ Modify presentation of the one or more content tiles within the         │
│ paginated content grid user interface based on refresh criteria         │
│                                506                                      │
└─────────────────────────────────────────────────────────────────────────┘
```

SYSTEMS AND METHODS FOR PROVIDING CONTENT

CROSS-REFERENCE TO RELATED APPLICATIONS

This application claims priority to U.S. Provisional Patent Application No. 62/827,135, filed on Mar. 31, 2019 and entitled "SYSTEMS AND METHODS FOR PROVIDING CONTENT", which is incorporated herein by reference in its entirety.

FIELD OF THE INVENTION

The present technology relates to digital content provision. More particularly, the present technology relates to graphical user interfaces for providing digital content.

BACKGROUND

Today, people often utilize computing devices (or systems) for a wide variety of purposes. Users can use their computing devices to, for example, interact with one another, access content, share content, and create content. In some cases, content items can include postings from members of a social networking system. Content items may include media content items, such as videos. Content items may be published to the social networking system or any other content platform for consumption by others.

SUMMARY

Various embodiments of the present technology can include systems, methods, and non-transitory computer readable media configured to receive one or more content tiles to be presented to a user, wherein the one or more content tiles are arranged in an order. The one or more content tiles are presented within one or more pages of a paginated content grid user interface. Each page comprises a plurality of positions defined by a plurality of rows and a plurality of columns. Presentation of the one or more content tiles within the paginated content grid user interface is modified based on refresh criteria.

In an embodiment, modifying presentation of the one or more content tiles within the paginated content grid user interface based on refresh criteria comprises: receiving a set of actions for modifying presentation of the one or more content tiles.

In an embodiment, modifying presentation of the one or more content tiles within the paginated content grid user interface based on refresh criteria comprises: determining that the set of actions comprises fewer than a threshold number of actions; and in response to determining that the set of actions comprises fewer than a threshold number of actions, animating translation of at least some of the one or more content tiles based on the set of actions.

In an embodiment, modifying presentation of the one or more content tiles within the paginated content grid user interface based on refresh criteria comprises: determining that the set of actions comprises greater than a threshold number of actions; and in response to determining that the set of actions comprises greater than a threshold number of actions, modifying presentation of the one or more content tiles based on the set of actions without animating translation of the one or more content tiles.

In an embodiment, the refresh criteria comprises a threshold period of time.

In an embodiment, modifying presentation of the one or more content tiles within the paginated content grid user interface is performed based on a determination that a user has not interacted with the paginated content grid user interface for at least the threshold period of time.

In an embodiment, each content tile of the one or more content tiles is associated with one or more content items.

In an embodiment, selection of a content tile causes presentation of the one or more content items associated with the content tile.

In an embodiment, each content tile of the one or more content tiles is associated with one or more stories uploaded to a social networking system.

In an embodiment, selection of a content tile causes presentation of the one or more stories in a full screen viewer.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

BRIEF DESCRIPTION OF THE DRAWINGS

FIG. 5 illustrates an example method, according to an embodiment of the present technology.

Figure 1:
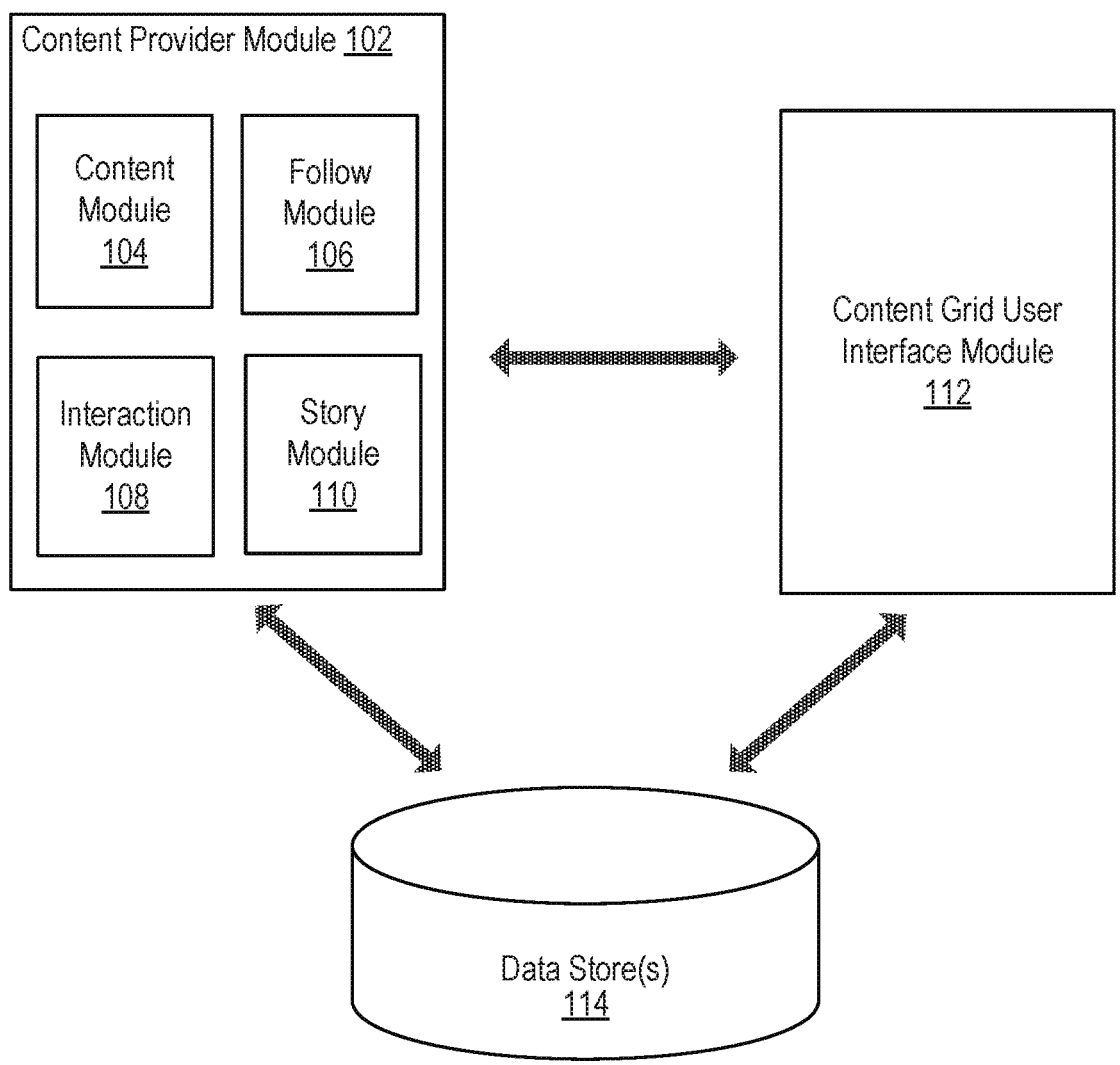
FIG. 1 illustrates an example system including a content provider module and a content grid user interface module, according to an embodiment of the present technology.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Approaches for Providing Digital Content

People often utilize computing devices (or systems) for a wide variety of purposes. Users can use their computing devices to, for example, interact with one another, access content, share content, and create content. In some cases, content items can include postings from members of a social networking system. Content items may include media content items, such as videos. Content items may be published to the social networking system or any other content platform for consumption by others.

A content platform, such as a social networking systems, may provide users with one or more graphical user interfaces to access content available on the content platform. User experience with a content platform may be affected, either positively or negatively, by graphical user interfaces offered by the content platform. Intuitive and easy-to-use graphical user interfaces may provide users with positive experiences while difficult or confusing graphical user interfaces may result in frustrating experiences and may dissuade future utilization of the content platform by users. As such, it is an important consideration for digital content platforms and content providers to provide users with pleasing and easy-to-understand graphical user interfaces for accessing content on the content platform. At the same time, it may also be advantageous for a content platform to provide graphical user interfaces that efficiently present as much content as possible to a user. However, presenting greater amounts of content within limited display space (e.g., within the display on a mobile device) can result in confusing and unintuitive graphical user interfaces. As such, it can be appreciated that it is an important consideration for content providers to design new and improved graphical user interfaces that effectively balance these interests. Conventional approaches may not be effective in addressing these and other problems arising in computer technology.

An improved approach rooted in computer technology overcomes the foregoing and other disadvantages associated with conventional approaches specifically arising in the realm of computer technology. In general, the presently disclosed technology can present content items within a paginated content grid user interface. The paginated content grid user interface may comprise one or more pages, with each page comprising one or more content tiles. Each content tile may be associated with one or more content items. Each page may be arranged in a grid comprising a plurality of columns and a plurality of rows and each position within the grid may represent a potential position for a content tile. For example, each page may be a 3 by 2 grid having 3 columns and 2 rows such that each page is capable of presenting six content tiles. In various embodiments, rules may be implemented for presenting content tiles (and their associated content items) within the one or more pages. For example, in an embodiment, content tiles may be ranked and ordered based on their ranking. Content tiles may be positioned within the one or more pages based on their ranking and ordering. Furthermore, in various embodiments, rules may be implemented for refreshing content tiles and their presentation within the one or more pages. Content tiles may be refreshed (or updated) in order to, for example, insert a new content tile, remove an existing content tile, re-order content tiles, and the like. Various rules for refreshing content tiles may be implemented in order to provide users with an easy-to-understand and intuitive user interface for accessing content items. More details relating to the disclosed technology are provided below.

FIG. 1 illustrates an example system 100 including a content provider module 102 and a content grid user interface module 112, according to an embodiment of the present technology. The content provider module 102 and the content grid user interface module 112 can collectively be configured to provide users with access to content posted to a digital content platform, such as a social networking system. Such content can include content items that are accessible using paginated content grid user interfaces. As shown in the example of FIG. 1, the content provider module 102 can include a content module 104, a follow module 106, an interaction module 108, and a story module 110. In some instances, the example system 100 can include at least one data store 114. The components (e.g., modules, elements, etc.) shown in this figure and all figures herein are exemplary only, and other implementations may include additional, fewer, integrated, or different components. Some components may not be shown so as not to obscure relevant details. In various embodiments, one or more of the functionalities described in connection with the content provider module 102 and/or the content grid user interface module 112 can be implemented in any suitable combinations.

In some embodiments, the content provider module 102 and/or the content grid user interface module 112 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the content provider module 102 and/or the content grid user interface module 112 can be, in part or in whole, implemented as software running on one or more computing devices or systems, such as on a server system or a client computing device. In some instances, the content provider module 102 and/or the content grid user interface module 112 can be, in part or in whole, implemented within or configured to operate in conjunction with or be integrated with a social networking system (or service), such as a social networking system 630 of FIG. 6. Likewise, in some instances, the content provider module 102 and/or the content grid user interface module 112 can be, in part or in whole, implemented within or configured to operate in conjunction with or be integrated with a client computing device, such as the user device 610 of FIG. 6. For example, the content provider module 102 and/or the content grid user interface module 112 can be implemented as or within a dedicated application (e.g., app), a program, or an applet running on a user computing device or client computing system. The application incorporating or implementing instructions for performing functionality of the content provider module 102 and/or the content grid user interface module 112 can be created by a developer. The application can be provided to or maintained in a repository. In some cases, the application can be uploaded or otherwise transmitted over a network (e.g., Internet) to the repository. For example, a computing system (e.g., server) associated with or under control of the developer of the application can provide or transmit the application to the repository. The repository can include, for example, an "app" store in which the application can be maintained for access or download by a user. In response to a command by the user to download the application, the application can be provided or otherwise transmitted over a network from the repository to a computing device associated with the user. For example, a computing system (e.g., server) associated with or under control of an administrator of the repository can cause or permit the application to be transmitted to the computing device of the user so that the user can install and run the application. The developer of the application and the administrator of the repository can be different entities in some cases, but can be the same entity in other cases. It should be understood that many variations are possible.

The content provider module 102 and/or the content grid user interface module 112 can be configured to communicate and/or operate with the at least one data store 114, as shown in the example system 100. The data store 114 can be configured to store and maintain various types of data. In some implementations, the data store 114 can store information associated with the social networking system (e.g., the social networking system 630 of FIG. 6). The information associated with the social networking system can include data about users, user identifiers, social connections, social interactions, profile information, demographic information, locations, geo-fenced areas, maps, places, events, pages, groups, posts, communications, content, feeds, account settings, privacy settings, a social graph, and various other types of data. In some embodiments, the data store 114 can store information that is utilized by the content provider module 102 and/or the content grid user interface module 112. For example, the data store 114 can store user-uploaded content items. It is contemplated that there can be many variations or other possibilities.

The content module 104 can be configured to provide users with access to content that is available through a digital content platform, such as a social networking system. In some instances, this content can include content items posted in content feeds accessible through the social networking system, i.e., content posts. For example, the content module 104 can provide a first user with access to content posts through an interface that is provided by a software application (e.g., a social networking application) running on a computing device of the first user. The first user can also interact with the interface to post content posts to the social networking system. Such content posts may include text, images, audio, and videos, to name some examples. For example, the first user can submit a content post to be published through the social networking system. In some embodiments, the content post can include, or reference, one or more media content items, such as images, video, audio, and/or text.

In various embodiments, other users of the social networking system can access content posts posted by the first user. In one example, the other users can access the content posts by searching for the first user by user name through an interface provided by a software application (e.g., a social networking application, browser, etc.) running on their respective computing devices. In some instances, some users may want to see content posts posted by the first user in their respective content feed. To cause content posts posted by the first user to be included in their respective content feed, a user can select an option through the interface to subscribe to, or "follow", the first user. The follow module 106 can process the user's request by identifying the user as a follower of (or "friend" of) the first user in the social networking system. As a result, some or all content posts that are posted by the first user can automatically be included in the respective content feed of the user. If the user decides that they no longer want to see content from the first user in their respective content feed, the user can select an option through the interface to unsubscribe from, or "unfollow", the first user. As a result, the follow module 106 can remove the association between the user and the first user so that content posts posted by the first user are no longer included in the content feed of the user.

In some instances, users may want to interact with content posts posted to a social networking system. For example, a user may want to endorse, or "like", a content post. In this example, the user can select an option provided in the interface to like the desired content post. The interaction module 108 can determine when a user likes a given content post and can store information describing this relationship. The interaction module 108 can also determine when other forms of user interaction are performed and can store information describing the interaction (e.g., information describing the type of interaction, the identity of the user, the identity of the user that posted the content post, and the content post, to name some examples). For example, the user may want to post a comment in response to a content post. In this example, the user can select an option provided in the interface to enter and post the comment for the desired content post. The interaction module 108 can determine when a user posts a comment in response to a given content post and can store information describing this relationship. Other forms of user interaction can include emoji-based reactions to a content post (e.g., selecting an option that corresponds to a particular reaction emoji, e.g., happy, sad, angry, etc.), re-sharing a content post, and transmitting a message to a user pertaining to a particular content post, for example.

In some embodiments, the story module 110 can provide an option that allows users to post their content as stories. In such embodiments, each user has a corresponding story collection in which the user can post content. When a user's story collection is accessed by another user, the story module 110 can provide content posted in the story collection to the other user for viewing. In certain embodiments, each user can have a story feed in which they can view stories posted by other users to their respective story collections. As such, a user's story feed can include the story collections of one or more users (e.g., one or more users that the user follows). In some embodiments, content posted in a user's story collection may be accessible by any user of the social networking system. In some embodiments, content posted in a user's story collection may only be accessible to followers of the user. In some embodiments, user stories posted to a user's story collection expire after a pre-defined time interval (e.g., every 24 hours). In such embodiments, content posted as a story in a story collection is treated as ephemeral content that is made inaccessible once the pre-defined time interval has elapsed. In contrast, content posted in certain other content feeds, such as a user (or follower) primary content feed, can be treated as non-ephemeral content that remains accessible for a longer and/or an indefinite period of time.

The content grid user interface module 112 can be configured to provide a paginated content grid user interface through which users can access content items available on a content platform. The content grid user interface module 112 may, for example, interact with the content provider module 102 in order to access content items posted to a content platform. As referenced, the paginated content grid user interface may comprise one or more pages, with each page comprising one or more content tiles. Each content tile may be associated with one or more content items. Each page may be arranged in a grid comprising a plurality of columns and a plurality of rows and each position within the grid may represent a potential position for a content tile. In various embodiments, rules may be implemented for presenting content tiles (and their associated content items) within the one or more pages. Furthermore, in various embodiments, rules may be implemented for refreshing (or updating) content tiles and their presentation within the paginated content grid user interface. Content tiles may be refreshed (or updated) in order to, for example, insert a new content tile, remove an existing content tile, re-order content tiles, and the like. More details regarding the content grid user interface module 112 will be provided below with reference to FIG. 2.

Figure 2:
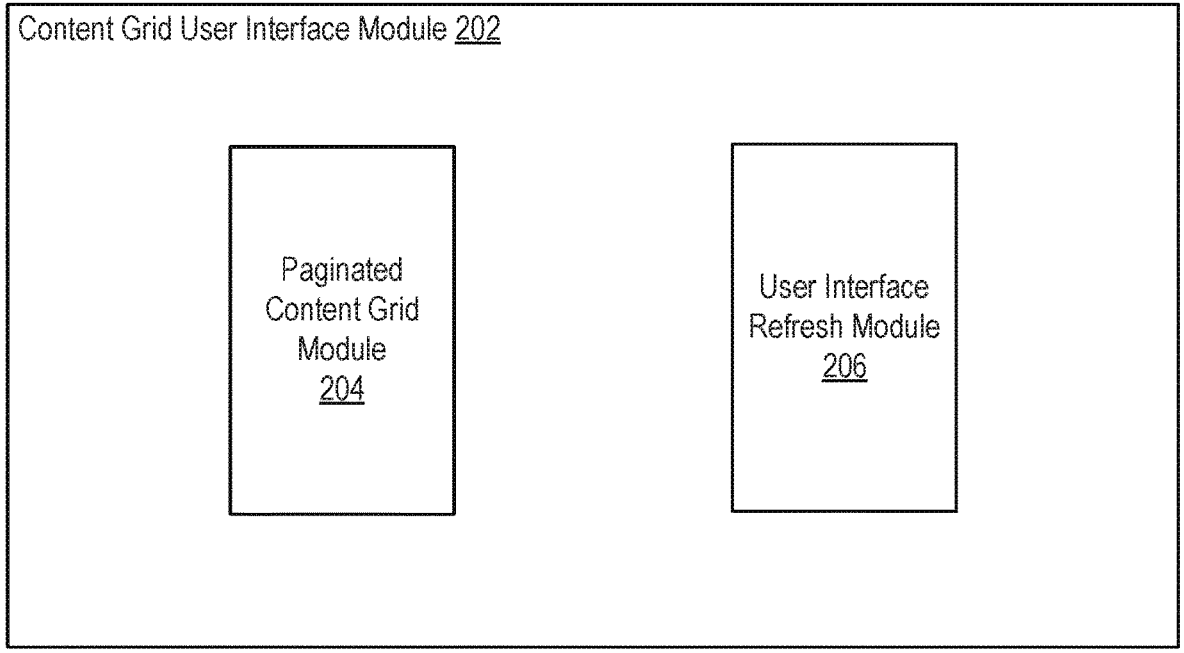
FIG. 2 illustrates an example content grid user interface module, according to an embodiment of the present technology.

FIG. 2 illustrates an example content grid user interface module 202 configured to provide a paginated content grid user interface, according to an embodiment of the present technology. In some embodiments, the content grid user interface module 112 of FIG. 1 can be implemented as the content grid user interface module 202. As shown in the example of FIG. 2, the content grid user interface module 202 can include a paginated content grid module 204 and a user interface refresh module 206.

The paginated content grid module 204 can be configured to present and/or provide access to one or more content items via a paginated content grid user interface. Such content items may include, for example, photos, videos, text, or any other content that may be available on a content platform. In certain embodiments, content items can include stories posted to a social networking system. Various examples discussed herein will discuss the paginated content grid user interface in the context of presenting stories in a user story feed. However, it should be understood that such disclosures are provided only as examples, and the present technology is not limited to stories, but may be applied to any kind of content item.

Figure 3:
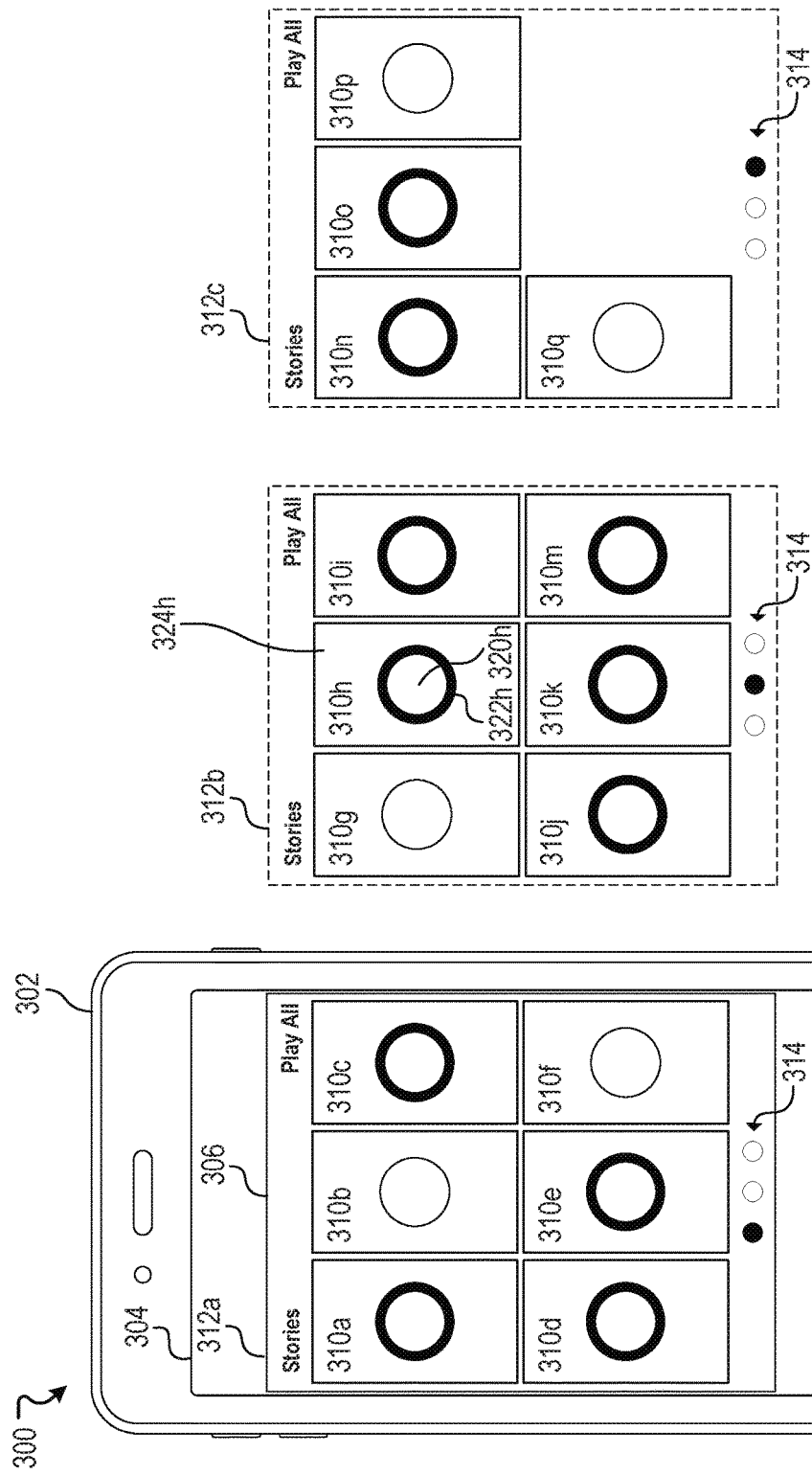
FIG. 3 illustrates an example paginated content grid user interface, according to an embodiment of the present technology.

An example scenario 300 is depicted in FIG. 3. The example scenario 300 includes a paginated content grid user interface 306 displayed on a display 304 of a mobile device 302. Various embodiments of the present technology, including various features of the paginated content grid module 204, will be discussed with reference to FIG. 3. As discussed above, a paginated content grid user interface can be utilized to present one or more content items to a user. For example, the one or more content items may comprise one or more stories posted by other users that the user has subscribed to (e.g., friended, followed, etc.). In an embodiment, a paginated content grid user interface can comprise one or more pages. Each page may comprise a grid having a plurality of rows and a plurality of columns. Each page may present one or more content tiles within its grid. Each content tile may be associated with one or more content items and may be utilized to access the one or more content items. For example, in one embodiment, each content tile may be associated with a particular user on a social networking system. If a first content tile is associated with a first user, a viewing user can select the first content tile in order to access (e.g., view) one or more stories that the first user has uploaded to his or her story collection.

In the example scenario 300, a viewing user has sixteen (16) content tiles that he or she can view (content tiles 310a-q). This may indicate, for example, that sixteen users that the viewing user has subscribed to have stories that are available for viewing, and each of the content tiles 310a-q may be associated with a particular user that the viewing user has subscribed to. The sixteen content tiles may be distributed over multiple pages, with each page having a fixed maximum number of content tiles that can be presented within the page. In the example paginated content grid user interface 306, there are three pages 312a, 312b, 312c, and each page has two rows and three columns. As such, each page 312a-c is capable of presenting a maximum of six content tiles. In the example scenario 300, a user is viewing a first page 312a, and pages 312b-c are off-screen and are not visible to the user. The user can access the second page 312b by, for example, swiping to the left. From the second page 312b, the user can access the third page 312c by swiping to the left once more or can return to the first page 312a by swiping to the right. The paginated content grid user interface 306 includes page indicators 314 which demonstrate to the user which page the user is currently viewing.

In an embodiment, content tiles may be presented in a particular order within the paginated content grid user interface. For example, in one embodiment, the one or more content tiles may be ranked and ordered based on the ranking. Content tiles may be ranked based on various ranking criteria. In one example, ranking criteria may include user affinity criteria such that for a particular viewing user, content tiles associated with users that have a higher affinity with the viewing user can be ranked relatively higher than content tiles associated with users that have a lower affinity with the viewing user. In another example, content tiles may be ranked based on a likelihood for the viewing user to access and/or view the content tile. The likelihood for the viewing user to view and/or access a particular content tile may be determined based on a machine learning model trained to determine such probabilities or likelihoods. In yet another example, content tiles may be ranked based on whether or not a viewer has viewed the content items associated with (e.g., contained within) each content tile. For example, content tiles with new content items that the viewing user has not yet viewed may be ranked higher than content tiles with content items that the viewing user has already viewed. In the example scenario 300, content tiles presented in the first page 312a may be ranked more highly (or ordered more highly) than content tiles presented in the second page 312b, and content tiles presented in the second page 312b may be ranked more highly than content tiles presented in the third page 312c. Furthermore, as discussed above, each page may comprise a grid which defines one or more positions within the page. In the example scenario 300, each page has two rows and three columns such that there are six defined positions in each page. Each position within a page may be ordered in a particular hierarchy. In one embodiment, the plurality of positions in a page may be ordered top-down from left to right. For example, the top left position in a page may represent a highest ranking for the page, the top center position may represent a second highest ranking, the top right position may represent a third highest ranking, the bottom left position may represent a fourth highest ranking, the bottom center position may represent a fifth highest ranking, and the bottom right position may represent a lowest ranking within the page. As such, if the set of content tiles 310a-q are ranked and arranged in an order [310a, 310b, 310c, 310d, . . . , 310q], the content tiles 310a-q can be filled into each position in each page according to their ranking. In this way, the position of each content tile within the paginated content grid user interface 306 may be indicative of its ranking. In an embodiment, when content tiles are loaded into the paginated content grid user interface (e.g., when a user first opens an application), the paginated content grid module 204 may present each content tile in the first page sequentially based on the ranking (sometimes this is referred to as a stagger animation or a stagger wipe animation). In this way, a user can be provided with a visual indication that the content tiles are arranged in a particular order. For example, when a user first opens an application, the paginated content grid user interface 306 may first appear blank. The paginated content grid module 204 can then load the first page 312a by first presenting the first content tile 310a, then presenting the second content tile 310b after a fixed duration of time (e.g., 100 ms after the first content tile 310a is presented), then presenting the third content tile 310c after the fixed duration of time (e.g., 100 ms after the second content tile 310*b* is presented), and so forth until all content tiles on the first page 312*a* are presented.

A viewing user can view content items using the paginated content grid user interface 306 by selecting any of the content tiles 310*a*-*q*. For example, content tile 310*c* may be associated with one or more content items. Consider an example scenario in which the content tile 310*c* is associated with a first user and is also associated with one or more stories that have been uploaded by the first user. If the viewing user selects content tile 310*c*, the paginated content grid module 204 can open a full-screen viewer which presents the one or more stories uploaded by the first user. In an embodiment, once the viewing user has viewed all of the content items associated with the content tile 310*c*, the paginated content grid module 204 can automatically begin playing content items associated with a next content tile, i.e., content tile 310*d*, which is directly after content tile 310*c* in the ordering/ranking of the content tiles. This can continue through all of the content tiles 310*d*-*q* until either the user decides to close the full-screen viewer or all content tiles have been accessed. In certain embodiments, if a user decides to close the full-screen viewer, the paginated content grid module 204 can cause an animation to occur in which the full-screen viewer appears to collapse into the content tile that was being accessed when the user closed to the full-screen viewer. For example, if the user closes the full-screen viewer while viewing content items associated with content tile 310*c*, the full-screen viewer may appear to collapse (e.g., shrink and disappear) into content tile 310*c*. If, however, the user continues to view content items associated with content tiles 310*c*, 310*d*, 310*e*, 310*f*, and 310*g*, and then closes the full-screen viewer while viewing content items associated with content tile 310*h*, the paginated content grid module 204 can transition from page 312*a* to 312*b* and depict the full-screen viewer collapsing into content tile 310*h*.

In an embodiment, each content tile 310*a*-*q* can include an identifier portion. In the example scenario 300, the identifier portion is depicted as a circle in the center of each content tile, such as the identifier portion 320*h* of content tile 310*h*. In an embodiment, the identifier portion may identify a user associated with the content tile. For example, if the content tile 310*h* is associated with a particular user, the identifier portion 320*h* may reflect or depict the name of the user and/or a profile picture of the user. In this way, a viewing user can determine that a particular content tile is associated with a particular user. In an embodiment, each content tile can include a preview portion. In the example scenario 300, the preview portion is depicted as the area surrounding the identifier portion, such as a preview portion 324*h* for content tile 310*h*. The preview portion may depict a preview of the content item(s) that will be presented if the user selects the content tile. For example, if the content tile 310*h* is associated with one or more stories uploaded by a first user, the preview portion 324*h* may depict a first frame of a first story that will be presented if a viewing user selects the content tile 310*h*. In an embodiment, content tiles can also include a new content indicator. In the example scenario 300, new content indicators are implemented using darkened circles around the identifier portion, such as a new content indicator 322*h* surrounding the identifier portion 320*h*. The new content indicator 322*h* indicates that the content tile has new content that the viewing user not yet viewed. For example, in the example scenario 300, content tile 310*a* has new content that the user has not yet viewed, but content tile 310*b* has already been viewed by the user and does not have any new content.

Returning to FIG. 2, the user interface refresh module 206 can be configured to refresh and/or re-load content tiles presented in a paginated content grid user interface. Content tiles may be refreshed for various reasons. For example, content tiles may be refreshed to insert new content tiles. This may occur, for example, if a user that did not previously have any available stories uploads a new story such that a new content tile should be inserted into a viewing user's story feed. In another example, content tiles may be refreshed to remove existing content tiles. This may occur, for example, if a user deletes his or her story, or a user's story expires, such that an existing content tile in a viewing user's story feed should be removed. In yet another example, content tiles may be refreshed to re-order content tiles. This may occur, for example, if a viewing user has viewed all the content items contained in a particular content tile, and that content tile may be re-ordered to the end of the viewing user's story feed.

In an embodiment, the user interface refresh module 206 can be configured to refresh a paginated content grid user interface based on one or more refresh criteria. In an embodiment, the refresh criteria may specify different actions to be taken based on the number of actions to be taken in a refresh. For example, if a refresh of a paginated content grid user interface involves only a single action, the user interface refresh module 206 can implement an animation that depicts one or more content tiles translating (e.g., horizontally) to new positions within the paginated content grid user interface based on the single action. Example scenarios are depicted in FIGS. 4A and 4B.

Figure 4A:
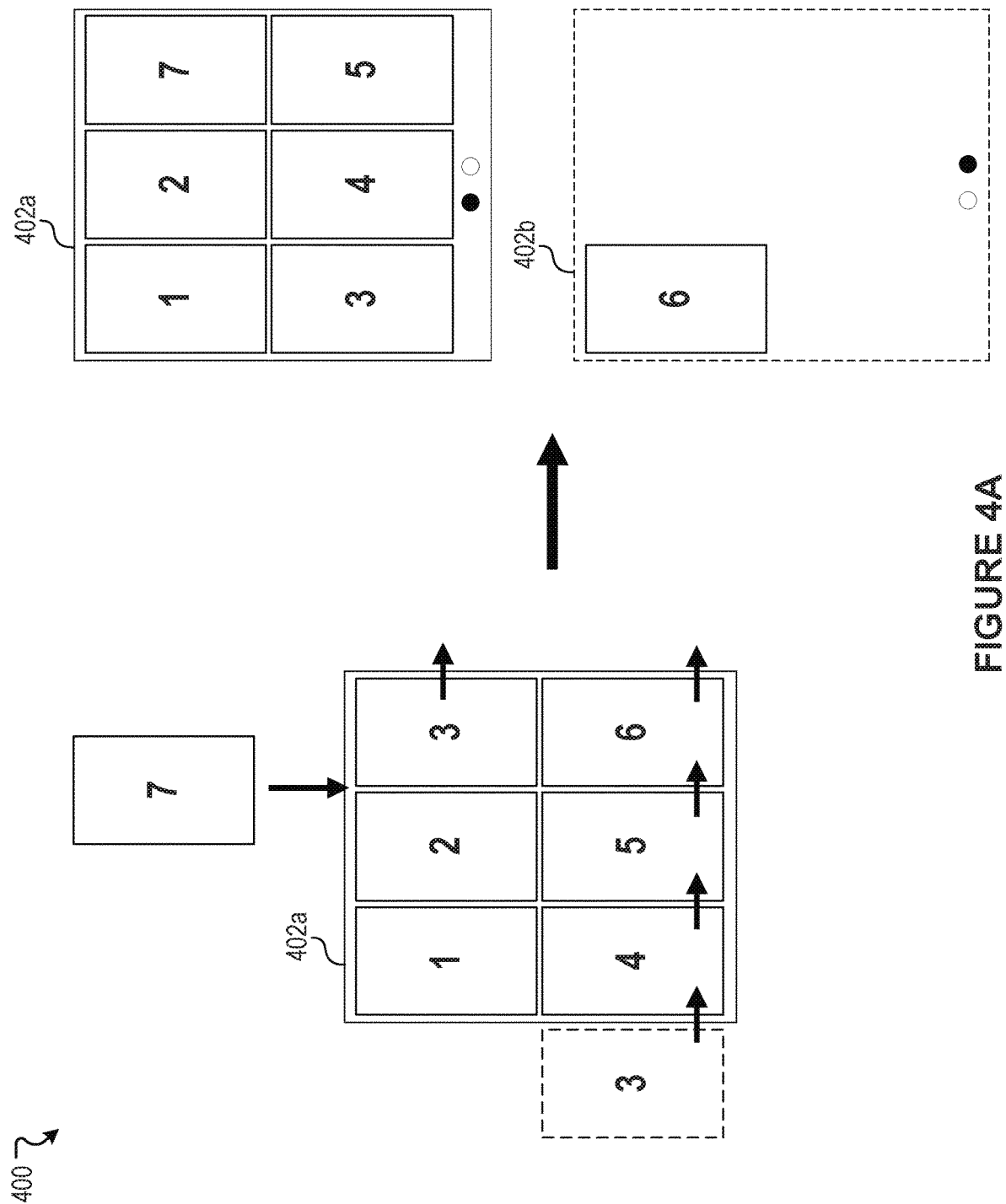
FIGS. 4A-4C illustrate various example scenarios associated with refreshing a paginated content grid user interface, according to various embodiments of the present technology.

FIG. 4A depicts an example scenario 400 in which a first page 402*a* of a paginated content grid user interface depicts six content items (numbered in ranked order from 1-6). However, when the paginated content grid user interface is refreshed, a determination is made that a new content tile (content tile 7) should be inserted between content tile 2 and content tile 3. This is the only action to be taken in this refresh. Since there is only a single action to be taken, an animation can be presented in which one or more content tiles are depicted as translating from one position to another in order to implement the desired action. In the example scenario 400, content tile 3 translates to the right off-screen to create space for the new content tile 7. Furthermore, content tiles 4, 5, and 6 also translate to the right, and content tile 3 appears to move from off-screen into the bottom-left position previously occupied by content tile 4. Content tile 6, by translating to the right, moves off-screen, and occupies the top-left position in a new second page 402*b*.

Figure 4B:
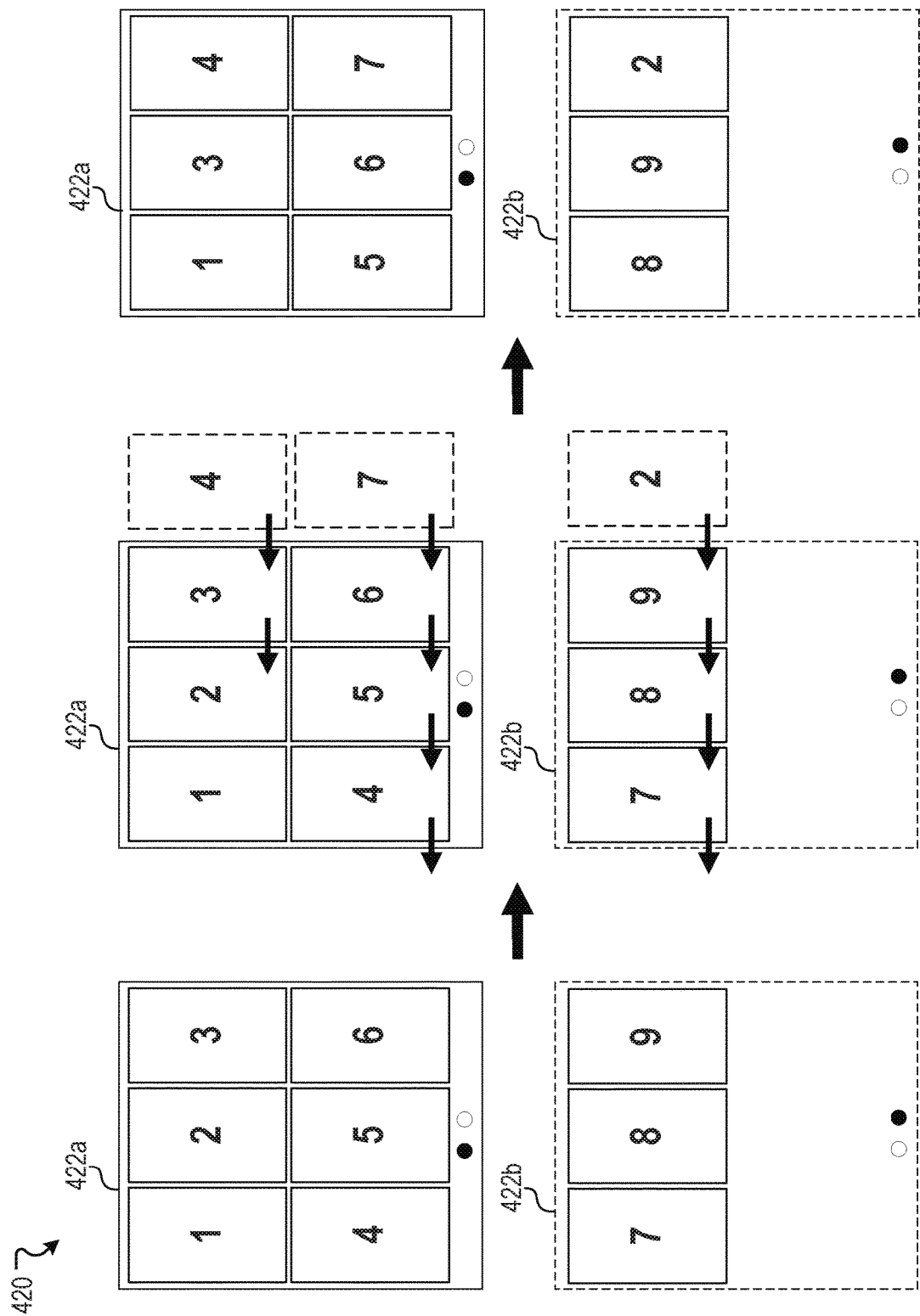

FIG. 4B depicts another example scenario 420 in which nine (9) content tiles are distributed over two pages 422*a*, 422*b*. In the example scenario 420, a user interface refresh comprises a single action: content tile 2 is being re-ordered from the second highest position to the ninth position. This may occur, for example, because a viewing user has viewed all the content items associated with content tile 2, and content tile 2 is now ranked as the last content tile whereas it was previously ranked as the second highest content tile. Once again, because the refresh includes only a single action to be taken (re-ordering content tile 2 from the second position to the ninth position), an animation can be presented in which one or more content tiles are depicted as translating from one position to another in order to implement the desired action. In the example scenario 420, content tile 2 disappears (e.g., shrinks or fades away), and content tile 3 translates left to fill the position previously occupied by content tile 2. Simultaneously, content tiles 4, 5, and 6 may also translate to the left, resulting in content tile 4 moving off-screen to the left. While content tile 4 is moving off-screen in the bottom row, content tile 4 may translate left on-screen in the top-row to occupy the position previously occupied by content tile 3. Similarly, content tile 7 may translate from off-screen on-screen to occupy the position previously occupied by content tile 6. In the example scenario 420, content tiles 7, 8, and 9 on the second page 422b are also shown as translating to the left, but this need not be implemented as an actual visual animation as this would not be seen by the viewing user because only the first page 422a is displayed to the user, and the second page 422b is off-screen. Likewise, content tile 2 is moved to the ninth position of the user interface into the position previously occupied by content tile 9. In an embodiment, translation of content tiles as reflected in animations may comprise only horizontal translation, and may not include vertical or diagonal translation. In another embodiment, translation of content tiles as reflected in animations may comprise only horizontal and vertical translation, and may not include diagonal translation. Many variations are possible.

Figure 4C:
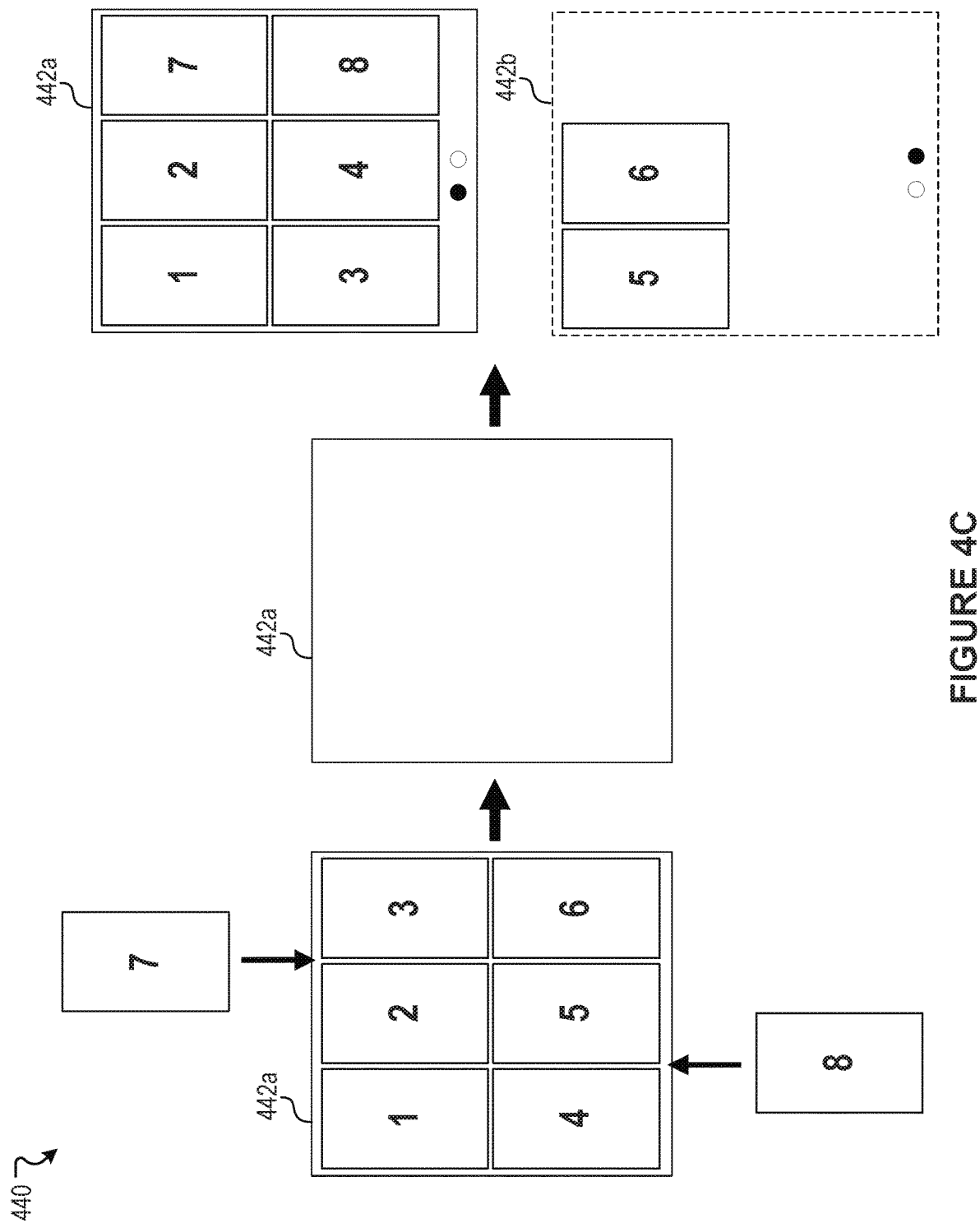

In an embodiment, if more than one action is to take place in a refresh, the user interface refresh module 206 may simply cause all of the content tiles to "re-load" without any lateral (e.g., horizontal or vertical) movement of the content tiles. This is due to the fact that multiple actions may cause very complex and disorienting translations of content items, and may be unintuitive and visually unappealing for a user. As such, in an embodiment, when multiple actions are to be taken in a refresh, all depicted content tiles may fade away, and a seemingly new set of content tiles may fill in the paginated content grid user interface (e.g., content tiles may fill the paginated content grid user interface using a stagger animation, as if the user has just opened the application). As such, an animation may still take place to demonstrate that a refresh has occurred, but the animation may not include horizontal or vertical translation of content tiles. FIG. 4C illustrates an example scenario 440 in which multiple actions are to take place in a refresh. In the example scenario 440, two actions are to take place: new content tile 7 is being inserted between content tiles 2 and 3, and new content tile 8 is being inserted between content tiles 4 and 5. Due to the fact that multiple actions are to take place in this refresh, the user interface refresh module 206 can remove content tiles 1-6 (e.g., a fade animation), and then can re-load the content tiles 1-8 in their new ordering and orientation (e.g., using a stagger animation). In this way, a user can be presented with a more visually appealing and more easily understandable user interface that improves user experience.

In certain embodiments, the user interface refresh module 206 can be configured to perform user interface refreshes only if certain refresh criteria are satisfied. In one embodiment, the user interface refresh module 206 may prevent user interface refreshes from occurring if a user is interacting with the paginated content grid user interface. For example, the refresh criteria may comprise a time threshold. If a user has interacted with the paginated content grid user interface within the threshold amount of time, the user interface refresh module 206 may prevent user interface refreshes from occurring. However, if the user has not interacted with the paginated content grid user interface within the threshold amount of time, the user interface refresh module 206 may perform a user interface refresh. In certain embodiments, the refresh criteria may comprise certain high priority refreshes that force a refresh, even if a user is interacting with the paginated content grid user interface. For example, if a user has deleted a story, or if a story has expired, a forced refresh may occur in order to remove the story (and possibly its associated content tile) from a viewing user's story feed. In certain embodiments, the user interface refresh module 206 may perform a user interface refresh based on user actions. For example, if a user performs a particular action (e.g., pulling down on the user interface, also known as a pull-to-refresh action), the user interface refresh module 206 may perform a user interface refresh.

FIG. 5 illustrates an example method 500, according to an embodiment of the present technology. It should be appreciated that there can be additional, fewer, or alternative steps performed in similar or alternative orders, or in parallel, within the scope of the various embodiments discussed herein unless otherwise stated.

At block 502, the example method 500 can receive one or more content tiles to be presented to a user, wherein the one or more content tiles are arranged in an order. At block 504, the example method 500 can present the one or more content tiles within one or more pages of a paginated content grid user interface, wherein each page comprises a plurality of positions defined by a plurality of rows and a plurality of columns. At block 506, the example method 500 can modify presentation of the one or more content tiles within the paginated content grid user interface based on refresh criteria.

It is contemplated that there can be many other uses, applications, and/or variations associated with the various embodiments of the present technology. For example, in some cases, user can choose whether or not to opt-in to utilize the disclosed technology. The disclosed technology can also ensure that various privacy settings and preferences are maintained and can prevent private information from being divulged. In another example, various embodiments of the present technology can learn, improve, and/or be refined over time.

Social Networking System—Example Implementation

Figure 6:
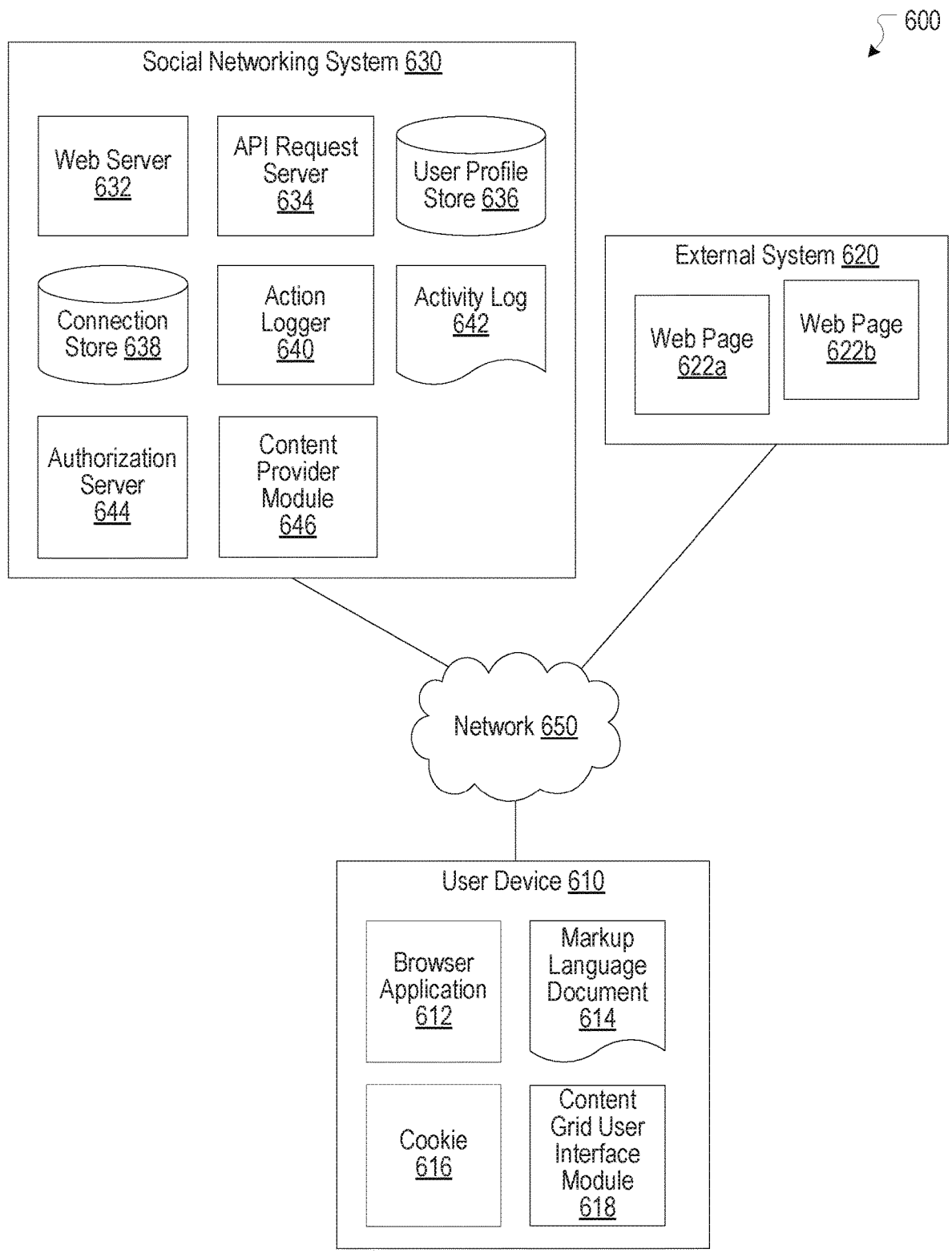
FIG. 6 illustrates a network diagram of an example system including an example social networking system that can be utilized in various scenarios, according to an embodiment of the present technology.

FIG. 6 illustrates a network diagram of an example system 600 that can be utilized in various scenarios, according to an embodiment of the present technology. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities.

The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a content provider module 646. The content provider module 646 can, for example, be implemented as the content provider module 102, as discussed in more detail herein. In some embodiments, the user device 610 can include a content grid user interface module 618. The content grid user interface module 618 can, for example, be implemented as the content grid user interface module 112 and/or the content grid user interface module 202, as discussed in more detail herein. As discussed previously, it should be appreciated that there can be many variations or other possibilities. For example, in some embodiments, one or more functionalities of the content provider module 646 can be implemented in the user device 610 and/or one or more functionalities of the content grid user interface module 618 can be implemented in the social networking system 630. As discussed previously, it should be appreciated that there can be many variations or other possibilities.

Hardware Implementation

Figure 7:
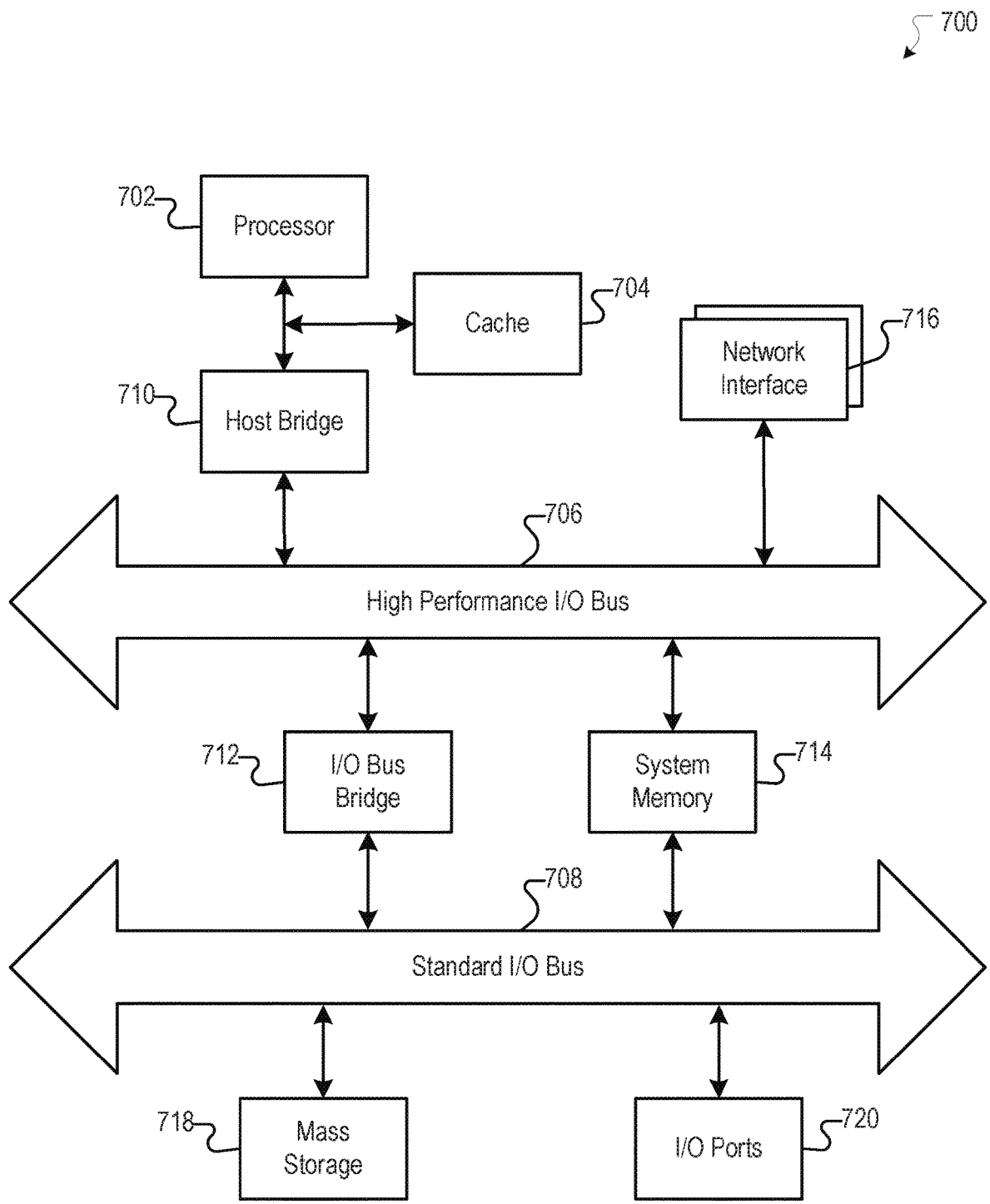
FIG. 7 illustrates an example of a computer system or computing device that can be utilized in various scenarios, according to an embodiment of the present technology.

The foregoing processes and features can be implemented by a wide variety of machine and computer system architectures and in a wide variety of network and computing environments. FIG. 7 illustrates an example of a computer system 700 that may be used to implement one or more of the embodiments described herein according to an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 620, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and 1/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the technology can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the present technology. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
receiving, by a computing system, one or more content tiles to be presented to a user, wherein the one or more content tiles are arranged in an order;
providing, by the computing system, the one or more content tiles within one or more pages of a paginated content grid user interface, wherein each page comprises a plurality of positions defined by a plurality of rows and a plurality of columns; and
modifying, by the computing system, presentation of the one or more content tiles within the paginated content grid user interface based on refresh criteria, wherein the modifying comprises:
receiving a set of actions to modify presentation of the one or more content tiles, the set of actions associated with a position change of at least one content tile with respect to the paginated content grid user interface;
determining that the set of actions comprises fewer than a threshold number of actions; and in response to determining that the set of actions comprises fewer than a threshold number of actions, animating translation of at least some of the one or more content tiles based on the set of actions.

2. The computer-implemented method of claim 1, wherein the modifying presentation of the one or more content tiles within the paginated content grid user interface based on refresh criteria further comprises:
determining that the set of actions comprises greater than a threshold number of actions; and
in response to determining that the set of actions comprises greater than a threshold number of actions, modifying presentation of the one or more content tiles based on the set of actions without animating translation of the one or more content tiles.

3. The computer-implemented method of claim 1, wherein the refresh criteria comprises a threshold period of time.

4. The computer-implemented method of claim 3, wherein the modifying presentation of the one or more content tiles within the paginated content grid user interface is performed based on a determination that a user has not interacted with the paginated content grid user interface for at least the threshold period of time.

5. The computer-implemented method of claim 1, wherein each content tile of the one or more content tiles is associated with one or more content items.

6. The computer-implemented method of claim 5, wherein selection of a content tile causes presentation of the one or more content items associated with the content tile.

7. The computer-implemented method of claim 6, wherein each content tile of the one or more content tiles is associated with one or more stories uploaded to a social networking system.

8. The computer-implemented method of claim 7, wherein selection of a content tile causes presentation of the one or more stories in a full screen viewer.

9. A system comprising:
at least one processor; and
a memory storing instructions that, when executed by the at least one processor, cause the system to perform a method comprising:
receiving one or more content tiles to be presented to a user, wherein the one or more content tiles are arranged in an order;
providing the one or more content tiles within one or more pages of a paginated content grid user interface, wherein each page comprises a plurality of positions defined by a plurality of rows and a plurality of columns; and
modifying presentation of the one or more content tiles within the paginated content grid user interface based on refresh criteria, wherein the modifying comprises:
receiving a set of actions to modify presentation of the one or more content tiles, the set of actions associated with a position change of at least one content tile with respect to the paginated content grid user interface;
determining that the set of actions comprises fewer than a threshold number of actions; and
in response to determining that the set of actions comprises fewer than a threshold number of actions, animating translation of at least some of the one or more content tiles based on the set of actions.

10. The system of claim 9, wherein the modifying presentation of the one or more content tiles within the paginated content grid user interface based on refresh criteria further comprises:
determining that the set of actions comprises greater than a threshold number of actions; and
in response to determining that the set of actions comprises greater than a threshold number of actions, modifying presentation of the one or more content tiles based on the set of actions without animating translation of the one or more content tiles.

11. The system of claim 9, wherein
the refresh criteria comprises a threshold period of time,
the modifying presentation of the one or more content tiles within the paginated content grid user interface is performed based on a determination that a user has not interacted with the paginated content grid user interface for at least the threshold period of time.

12. A non-transitory computer-readable storage medium including instructions that, when executed by at least one processor of a computing system, cause the computing system to perform a method comprising:
receiving one or more content tiles to be presented to a user, wherein the one or more content tiles are arranged in an order;
providing the one or more content tiles within one or more pages of a paginated content grid user interface, wherein each page comprises a plurality of positions defined by a plurality of rows and a plurality of columns; and
modifying presentation of the one or more content tiles within the paginated content grid user interface based on refresh criteria, wherein the modifying comprises:
receiving a set of actions to modify presentation of the one or more content tiles, the set of actions associated with a position change of at least one content tile with respect to the paginated content grid user interface
determining that the set of actions comprises fewer than a threshold number of actions; and
in response to determining that the set of actions comprises fewer than a threshold number of actions, animating translation of at least some of the one or more content tiles based on the set of actions.

13. The non-transitory computer-readable storage medium of claim 12, wherein the modifying presentation of the one or more content tiles within the paginated content grid user interface based on refresh criteria further comprises:
determining that the set of actions comprises greater than a threshold number of actions; and
in response to determining that the set of actions comprises greater than a threshold number of actions, modifying presentation of the one or more content tiles based on the set of actions without animating translation of the one or more content tiles.

14. The non-transitory computer-readable storage medium of claim 12, wherein
the refresh criteria comprises a threshold period of time,
the modifying presentation of the one or more content tiles within the paginated content grid user interface is performed based on a determination that a user has not interacted with the paginated content grid user interface for at least the threshold period of time.

15. The computer-implemented method of claim 7, wherein a content tile associated with a plurality of stories includes a preview portion depicting a frame of a story of the plurality of stories.

16. The computer-implemented method of claim 7, wherein a content tile associated with new content not viewed by the user includes an indicator to indicate the new content.

17. The computer-implemented method of claim 1, wherein the paginated content grid user interface is refreshed when the user has not interacted with the paginated content grid user interface for an amount of time within a threshold amount of time.

18. The computer-implemented method of claim 1, wherein the refresh criteria is associated with a forced refresh in which a content tile is removed from the paginated content grid user interface based on expiration of a story associated with the content tile.

19. The system of claim 9, wherein the refresh criteria is associated with a forced refresh in which a content tile is removed from the paginated content grid user interface based on expiration of a story associated with the content tile.

20. The non-transitory computer-readable storage medium of claim 12, wherein the refresh criteria is associated with a forced refresh in which a content tile is removed from the paginated content grid user interface based on expiration of a story associated with the content tile.

\* \* \* \* \*